US011981045B2

(12) United States Patent
Rebeaud et al.

(10) Patent No.: US 11,981,045 B2
(45) Date of Patent: May 14, 2024

(54) ADVANCE-SHAFT TRANSITION APPARATUS AND HOT FOIL STAMPING AND DIE-CUTTING EQUIPMENT

(71) Applicant: Bobst (Shanghai) Ltd, Shanghai (CN)

(72) Inventors: Jean-Claude Rebeaud, Le Mont-sur-Lausanne (CH); Peicong Qi, Shanghai (CN); Haoming Song, Shanghai (CN)

(73) Assignee: Bobst (Shanghai) Ltd, Shanghai (CN)

( * ) Notice: Subject to any disclaimer, the term of this patent is extended or adjusted under 35 U.S.C. 154(b) by 802 days.

(21) Appl. No.: 16/978,617

(22) PCT Filed: Mar. 4, 2019

(86) PCT No.: PCT/IB2019/051713
§ 371 (c)(1),
(2) Date: Sep. 4, 2020

(87) PCT Pub. No.: WO2019/171239
PCT Pub. Date: Sep. 12, 2019

(65) Prior Publication Data

US 2020/0406491 A1 Dec. 31, 2020

(30) Foreign Application Priority Data

Mar. 5, 2018 (CN) ......................... 201810179141.2

(51) Int. Cl.
*B26D 7/26* (2006.01)
*B26F 1/40* (2006.01)
(Continued)

(52) U.S. Cl.
CPC .................. *B26D 7/26* (2013.01); *B26F 1/40* (2013.01); *B41F 16/0046* (2013.01);
(Continued)

(58) Field of Classification Search
CPC ......... B65B 33/02; B65B 41/16; B65B 35/10; B65B 61/06; B65G 49/063; B21D 43/08;
(Continued)

(56) References Cited

U.S. PATENT DOCUMENTS 3,877,336 A * 4/1975 Hillesheimer ............ B26F 1/10 83/542
4,603,611 A * 8/1986 Ferguson ............. B21D 43/026 83/50

(Continued)

FOREIGN PATENT DOCUMENTS

CA 2415212 A1 6/2003
CN 2784185 Y 5/2006

(Continued)

OTHER PUBLICATIONS

International Search Report issued on Jun. 27, 2019, in counterpart International Patent Application No. PCT/IB2019/051713 (3 pages, in English).

*Primary Examiner* — Ghassem Alie
(74) *Attorney, Agent, or Firm* — Bookoff McAndrews, PLLC

(57) ABSTRACT

The present invention relates to an advance shaft transition apparatus for sheet processing equipment, which comprising: a plurality of advance shafts for feeding foils, the plurality of advance shafts being arranged along a horizontal direction; an advance shaft supporting frame, the advance shaft supporting frame supporting the ends of the advance shafts so that the advance shafts can freely rotate; and a lifting means, the lifting means is provided with a driving means and a transmission mechanism, the lifting means is connected to the advance shaft supporting frame to enable the advance shafts to move between a first position and a second position, at the first position, the advance shafts is operably rotated to feed the foil, and at the second position, (Continued)

the advance shafts being lifted up from the first position to leave a position where the foil can be fed.

20 Claims, 4 Drawing Sheets

(51) Int. Cl.
*B41F 16/00* (2006.01)
*B41F 19/00* (2006.01)
*B41F 19/06* (2006.01)
*B65H 5/06* (2006.01)

(52) U.S. Cl.
CPC .......... *B41F 16/006* (2013.01); *B41F 19/008* (2013.01); *B41F 19/066* (2013.01); *B65H 5/066* (2013.01); *B41P 2219/11* (2013.01); *B41P 2219/12* (2013.01); *B41P 2219/22* (2013.01)

(58) Field of Classification Search
CPC . B41F 19/06; B41F 19/00; B65H 5/06; B26F 1/38
USPC ........................................................... 83/665
See application file for complete search history.

(56) References Cited

U.S. PATENT DOCUMENTS

| | | | | | |
|---|---|---|---|---|---|
| RE34,125 | E | * | 11/1992 | Amos | B23Q 3/002 408/4 |
| 5,275,684 | A | | 1/1994 | Marazzi et al. | |
| 2010/0071519 | A1 | * | 3/2010 | Abel | B23D 33/02 83/13 |
| 2014/0246139 | A1 | | 9/2014 | Barth | |
| 2015/0321379 | A1 | * | 11/2015 | Hoover | B27B 25/06 144/248.4 |

FOREIGN PATENT DOCUMENTS

| | | | | | |
|---|---|---|---|---|---|
| CN | 201020918 | Y1 | | 2/2008 | |
| CN | 101524912 | A | | 9/2009 | |
| CN | 201456541 | U | | 5/2010 | |
| CN | 102248765 | A | | 11/2011 | |
| CN | 102380972 | A | | 3/2012 | |
| CN | 203282835 | U | | 11/2013 | |
| CN | 104339300 | A | | 2/2015 | |
| CN | 103097137 | A | | 5/2015 | |
| CN | 105538412 | A | | 5/2016 | |
| CN | 105800630 | A | | 7/2016 | |
| CN | 205364080 | U | | 7/2016 | |
| CN | 205523000 | U | | 8/2016 | |
| CN | 106628338 | B | * | 11/2017 | B65B 33/02 |
| CN | 207028335 | U | | 2/2018 | |
| DE | 102015213171 | B3 | | 1/2017 | |
| JP | S51-055085 | A | | 5/1976 | |
| JP | S59-119758 | A | | 7/1984 | |
| JP | 6135796 | U | | 3/1986 | |
| JP | H08-034112 | A | | 2/1996 | |
| JP | H08-183521 | A | | 7/1996 | |
| JP | H09-099501 | A | | 1/1997 | |
| JP | H10-203095 | A | | 8/1998 | |
| JP | 2012-218784 | A | | 11/2012 | |
| JP | 2015-516897 | A | | 6/2015 | |
| KR | 10-2014-0145179 | A | | 12/2014 | |
| WO | WO 2012/116781 | A1 | | 9/2012 | |
| WO | WO 2013/143664 | A1 | | 10/2013 | |
| WO | WO 2019/171239 | A1 | | 9/2019 | |

* cited by examiner

ADVANCE-SHAFT TRANSITION APPARATUS AND HOT FOIL STAMPING AND DIE-CUTTING EQUIPMENT

CROSS-REFERENCE TO RELATED APPLICATION(S)

This application is a National Stage under 35 U.S.C. § 371 of International Application No. PCT/IB2019/051713, filed on Mar. 4, 2019, which claims priority to Chinese Patent Application No. 201810179141.2, filed on Mar. 5, 2018, the contents of all of which are incorporated by reference in their entirety.

FIELD OF THE INVENTION

The present invention relates to the field of packaging, and particularly relates to hot foil stamping and die-cutting equipment for mode transition.

BACKGROUND OF THE INVENTION

A hot foil stamping technology is a technology for pressing a metallic foil or hologram on thin paper, card paper, a composite material, plastic and a corrugated board via heating and pressing. Flat-pressing flat-die-cutting is a process suitable for carrying out die cutting, indentation, embossing, stripping and full stripping on various types of paper, such as thin paper, card paper, corrugated paper, plastic, an in-mold label, a micro corrugated paperboard and most of corrugated paperboards. Operation of a hot foil stamping die cutting machine is similar with that of a flat-pressing flat-die-cutting machine in principle, and functions of some equipment can be interchanged.

When a hot foil stamping mode is subjected to transition into a die-cutting mode, generally, transition can be completed by disassembling an advance shaft for enabling a metal foil to move in the original hot foil stamping mode, then mounting an upper cutting die board, then mounting a stripping assembly and the like. Therefore, mode transition of hot foil stamping die-cutting equipment is time-consuming and strenuous.

Therefore, existing hot foil stamping die-cutting equipment needs to be modified so as to improve convenience of mode transition.

SUMMARY OF INVENTION

In order to improve the convenience of mode transition, the present invention provides an advance shaft transition apparatus in a hot foil stamping device, which comprises: at least one advance shaft for feeding foils to a stamping area; advance shaft supporting means, the advance shaft supporting means supporting at least part of at least one advance shaft in a manner that the at least one advance shaft can rotate; and lifting means connected to the advance shaft supporting means to enable the shaft supporting means together with the at least one advance shaft to move between a first position and a second position, wherein at the first position, the at least one advance shaft being in an operation position, and at the second position, the at least one advance shaft being in a non-operation position to give access to an operation area.

According to one aspect of the present invention, the advance shaft supporting means comprise a frame, supporting the at least one advance shaft at its extremities.

According to another aspect of the present invention, the lifting means comprise a handle, driving means and/or transmission means.

According to another aspect of the present invention, the driving means comprise one or more of a motor, a belt, a chain, a cable, hydraulics and pneumatics.

According to another aspect of the present invention, the transmission means comprises a belt, chain, gear, pulley and/or rod.

According to another aspect of the present invention, the driving means comprise a motor, the transmission means comprise a lifting member, the lifting member being connected to the advance shaft supporting means and the motor enabling the lifting member to extend and retract.

According to another aspect of the present invention, the transmission means further include a plurality of pulleys, and the lifting member are arranged around the pulleys.

According to another aspect of the present invention, the transmission means further include a transmission rod driven by the driving means, the transmission rod extending substantially parallel to the at least one advance shaft, one end of the lifting member being engaged with the transmission rod and the other end of the lifting member being engaged with the advance shaft supporting means.

According to another aspect of the present invention, the advance shaft supporting means includes a first bracket for supporting a first end of the at least one advance shaft and a second bracket for supporting a second end of the at least one advance shaft; and the transmission means include first lifting member connecting to the first bracket and second lifting member connected to the second bracket, the first lifting member is respectively connected to a first end of the transmission rod and the first bracket, and the second lifting member is respectively connected to a second end of the transmission rod and the second bracket.

According to another aspect of the present invention, wherein the lifting means further includes an accommodating guide for accommodating an end portion of the lifting member, and the accommodating guide is arranged in a plane perpendicular to the transmission rod.

According to another aspect of the present invention, the motor is mounted outside of the end of the advance shaft.

According to another aspect of the present invention, the lifting means move the advance shafts to the second position from the first position in a direction basically perpendicular to a horizontal plane.

The present invention also provides with a hot foil stamping and die-cutting equipment provided with the advance shaft transition apparatus and having a hot foil stamping working mode and a die-cutting working mode, wherein when the hot foil stamping die-cutting equipment is in the hot foil stamping working mode, the advance shafts are positioned at the first position, and when the hot foil stamping die-cutting equipment is in the die-cutting working mode, the advance shafts are positioned at the second position.

According to one aspect of the present invention, the hot foil stamping die-cutting equipment comprises: a feeding station, the feeding station being used for feeding sheets to the hot foil stamping die-cutting equipment; a platen station, the platen station being positioned on the downstream of the feeding station along a sheet conveying direction and used for carrying out pressing-cutting or embossing machining on the sheets; a foil-feeding and stripping station, the foil-feeding and stripping station being positioned on the downstream of the platen station along a sheet conveying path; and a delivery station, the delivery station being positioned on the downstream of the foil-feeding and stripping station and used for enabling the machined sheets to form a sheet stack, wherein the advance shaft transition apparatus is arranged in the foil-feeding and stripping station, and when the hot foil stamping die-cutting equipment is in a die-cutting mode, the advance shaft is moved to the second position, and a stripping apparatus is arranged below the advance shafts.

By adopting the advance shaft transition apparatus according to the present invention, convenience in transition of the hot foil stamping and die-cutting equipment between the bronzing and die-cutting modes is obviously improved.

REFERENCE NUMBER LIST

Figure 1:
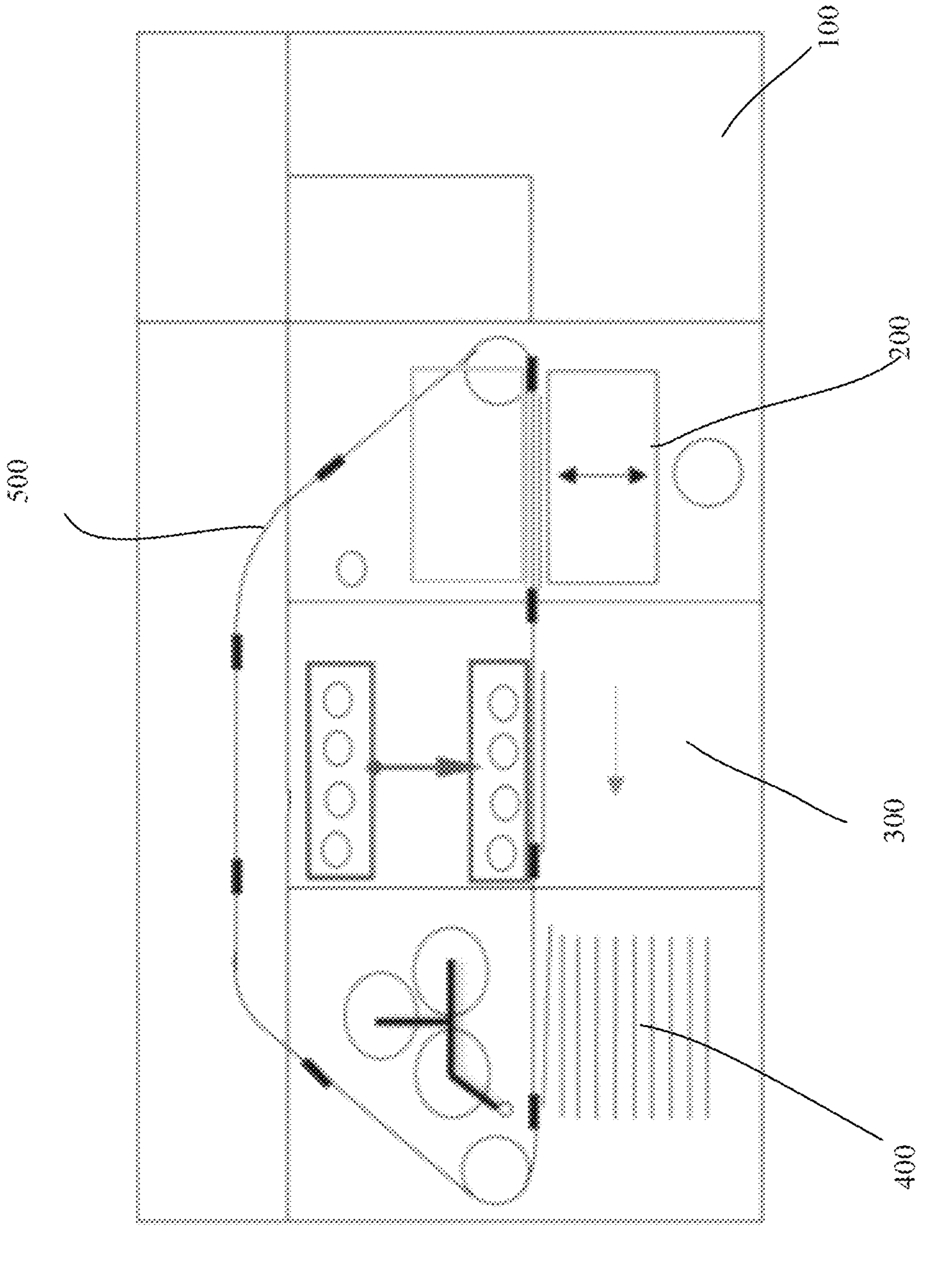
FIG. 1 shows a schematic diagram of hot foil stamping and die-cutting equipment according to the present invention.

10 hot foil stamping die-cutting equipment
16 top equipment frame
18*a* lower base of the equipment
100 feeding station
200 platen station
300 foil-feeding and stripping station
400 delivery station
500 conveying apparatus
20 advance shaft transition apparatus
21 advance shaft
22 advance shaft supporting means
23 driving means
24 lift member
25 transmission rod
26 pulley
27 accommodating guide
29 transmission chain

DESCRIPTION OF THE EMBODIMENTS

Hereinafter, the present invention will be described further in conjunction with particular embodiments and accompanying drawings. More details are illustrated in the following description for sufficient understanding of the present invention, however, the present invention can be implemented in many other manners different from what is described here obviously. A person skilled in the art can make similar promotions and deductions without departing from the essence of the present invention as required and thus the protection scope of the present invention shall not be limited by the disclosure of these particular embodiments.

FIG. 1 shows a schematic diagram of hot foil stamping and die-cutting equipment 10 used in the field of paperboard packaging. The hot foil stamping and die-cutting equipment 10 consists of a plurality of stations, and has a hot foil stamping working mode and a die-cutting working mode. Generally, along a direction of a main conveying path of sheets in the hot foil stamping and die-cutting equipment 10, the hot foil stamping and die-cutting equipment 10 sequentially includes: a feeding station 100, the feeding station 100 being used for feeding sheets, such as paperboards, to the hot foil stamping and die-cutting equipment 10; a platen station 200, a plating machine being arranged at the station 200 so as to carry out forming machining of pressing-cutting, embossing, stamping and the like; a foil-feeding and stripping station 300, the station 300 being used for conveying of a hot-ironed foil material or stripping processing after die-cutting; and a delivery station 400, the station enabling a machined sheet to reform a stack so as to facilitate subsequent machining steps. Moreover, a conveying apparatus 500, which includes such as conveying chain and locking means for clamping sheets provided on the chain, for conveying the sheets between each station is also arranged in the equipment 10.

For the hot foil stamping working mode and the die-cutting working mode of the hot foil stamping and die-cutting equipment 10, arrangement structures in the foil-feeding and stripping station 300 need to be subjected to transition.

Figure 2:
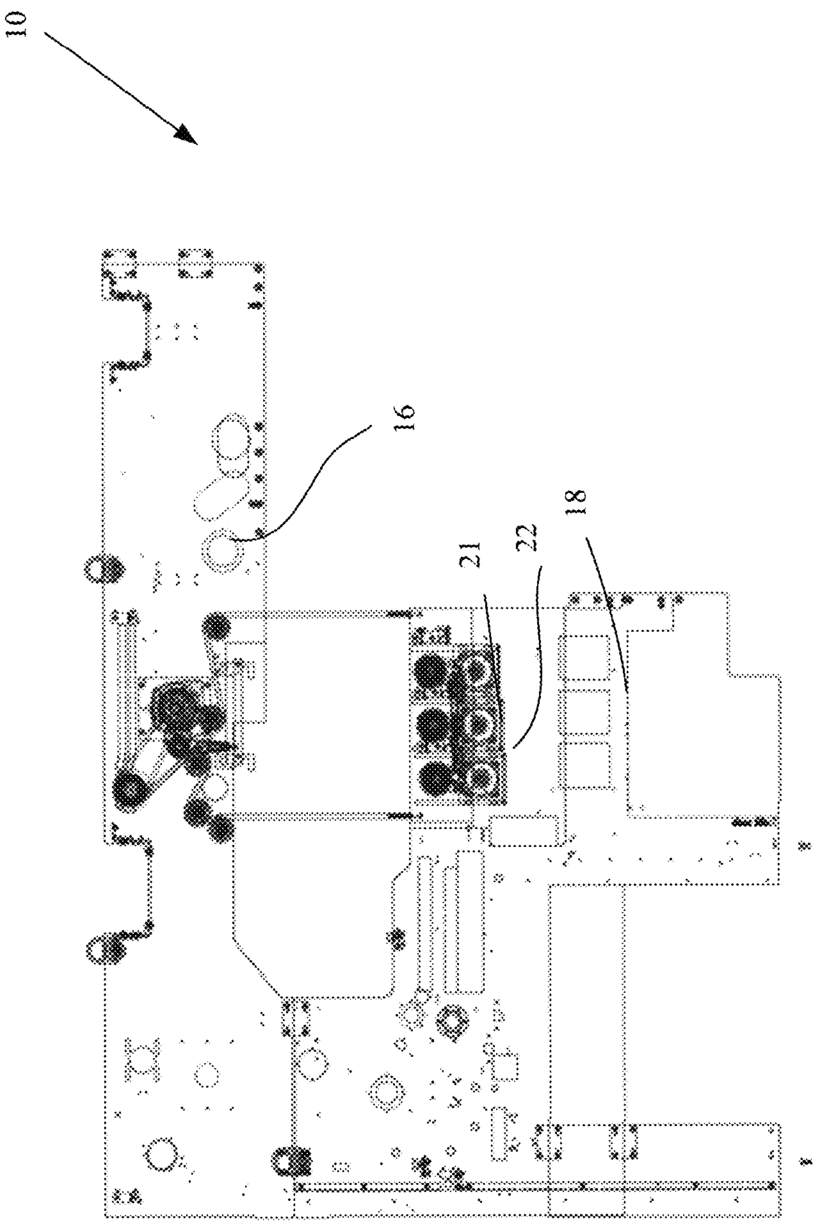
FIG. 2 shows a side sectional view of the hot foil stamping and die-cutting equipment according to the present invention, wherein the hot foil stamping and die-cutting equipment is in a bronzing working mode.

When the hot foil stamping and die-cutting equipment 10 is adopted to carry out bronzing processing, there is at least one advance shaft 21 arranged in the station 300, and the advance shaft 21 is arranged at a position close to a lower base 18 of the equipment, as shown in FIG. 2, so as to guide the foil material to move forwards to carry out bronzing processing. The foil material is fed to the platen station 200 by the advance shafts 21, a to-be-machined sheet is also conveyed to the platen station 200 from the feeding station 100 along the main conveying path, and the foil material and the to-be-machined sheet simultaneously pass through a space between a top platen and a bottom platen which form a die-cutting machine so as to execute proper hot foil stamping processing.

Figure 3:
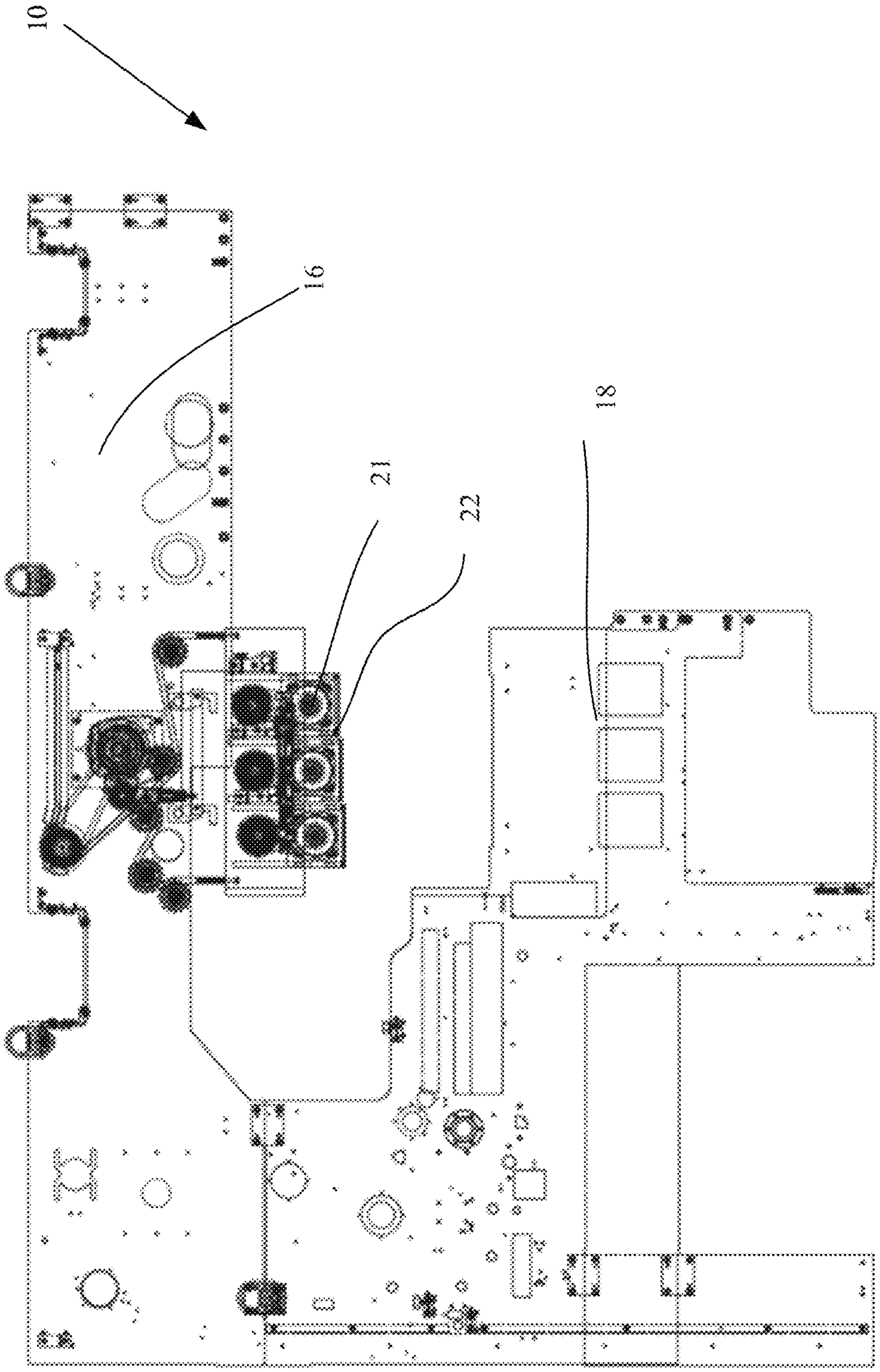
FIG. 3 shows a side sectional view of the hot foil stamping and die-cutting equipment according to the present invention, wherein the hot foil stamping and die-cutting equipment is in a die-cutting working mode.

When the hot foil stamping and die-cutting equipment 10 is adopted to carry out die-cutting machining, the advance shafts 21 in the station 300 is moved to a position below, which is close to a top equipment frame 16 of the equipment, as shown in FIG. 3, a stripping apparatus is mounted in the station 300, and meanwhile, the platens of the platen station 200 are replaced with machining tools for die-cutting, so that the sheet fed to the station 200 from the feeding station 100 is subjected to die-cutting machining on the platen station 200, then the sheet subjected to die-cutting machining is conveyed to the stripping station 300 by the conveying apparatus 500, and on the stripping station 300, the equipment 10 carries out stripping processing on the sheet.

According to the present invention, the hot foil stamping and die-cutting equipment 10 is particularly provided with an advance shaft transition apparatus 20 on the foil-feeding and stripping station 300, which is used for carrying out transfer transition on an arrangement position of the advance shaft 21 in the equipment machining mode switching process.

As shown in FIG. 2, the advance shaft transition apparatus 20 mainly includes a plurality of advance shafts 21 for feeding a hot-stamping material, such as a metal foil, to a stamping area in the hot stamping device, an advance shaft supporting means 22 for supporting the advance shaft 21 and a lifting means for moving the advance shaft 21.

Figure 4:
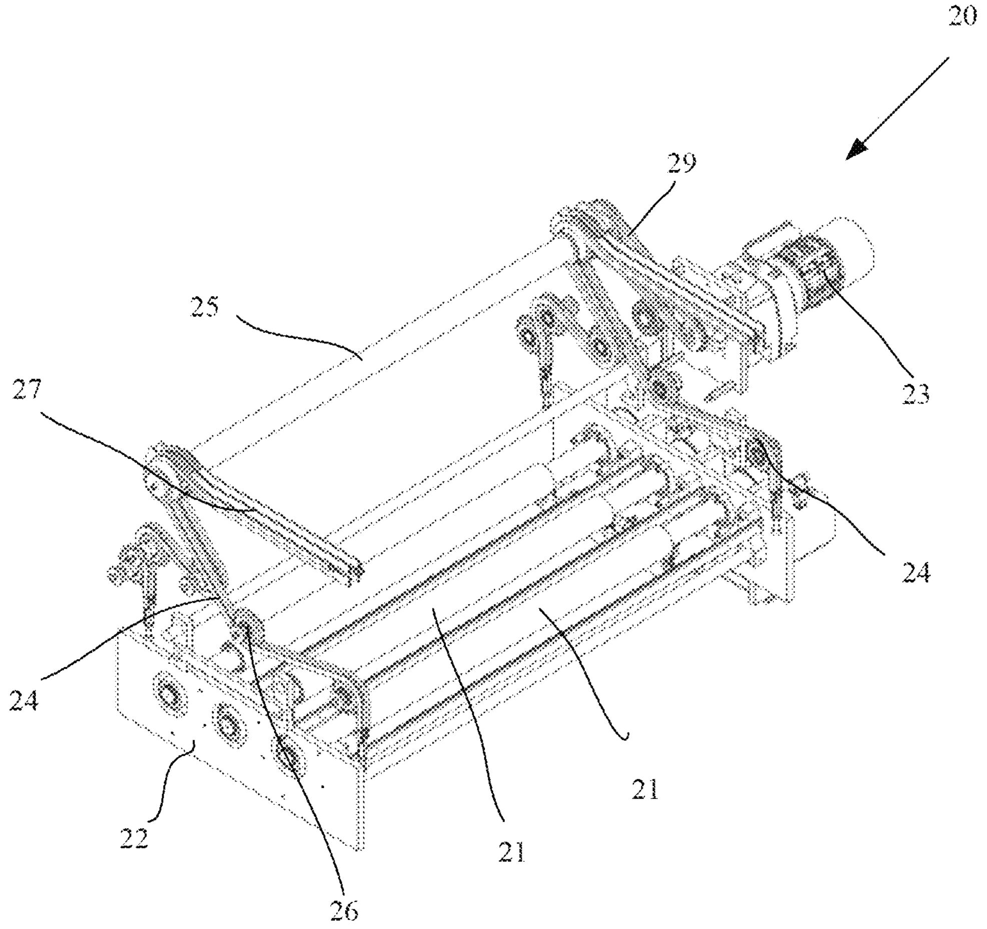
FIG. 4 shows a stereoscopic diagram of an advance-shaft transition apparatus according to the present invention.

FIG. 4 shows three advance shafts 21, but more or fewer advance shafts 21 may also be arranged according to actual demands. Those advance shafts 21 are arranged basically in parallel with each other along a horizontal direction, and can rotate to propel the foil material for hot stamping towards the stamping area in the platen station 200.

As shown in FIG. 4, the advance shaft supporting means 22 is configured in a frame structure, and it preferably includes two brackets for respectively supporting the opposite ends of each advance shaft 21, and both ends of the advance shaft 21 are respectively rotatably supported by two brackets of the advance shaft supporting means 22. A driving apparatus for the advance shaft 21 may also be fixed on one side of the advance shaft supporting means 22 so as to carry out rotary driving on the advance shaft 21.

The lifting means of the advance shaft transition apparatus 20 includes a driving means 23 and a transmission means. The driving means 23 is configured to produce a driving force, and the transmission means is configured to transmit the driving force to the advance shaft supporting means 22. Specifically, the transmission means is connected between the driving means 23 and the advance shaft supporting frame 22. The driving means 23 drives the transmission means to enable the advance shaft supporting means 22 together with the advance shafts thereon to move between a first position and a second position. As shown in FIG. 2, in the first position, the advance shaft 21 is located in an operation position, that is, when the supporting means 22 moves into the first position, the hot stamping and die cutting device is in the hot stamping mode, wherein the advance shafts 21 are operably rotated to feed the hot-stamping material, such as a metallic foil, towards the a stamping area. As shown in FIG. 3, when the supporting means 22 moves into the second position, the supporting means 22 brings the advance shaft 21 into a non-operation position to give access to an operation area. The second position is a position to which the advance shaft 21 is lifted to from the first position when the device is in the die-cutting mode, and in the second position, the supporting means 22 and the advance shafts 21 thereon are moved close to a top equipment frame 16 of the device.

According to a preferred embodiment of the present invention, the driving means 23 in the lifting means adopts a motor. The motor 23 is preferably and fixedly mounted on the top equipment frame 16 of the hot stamping device, and mounted outside of the end portion of the advance shaft 21. The end portion of a driving shaft of the motor 23 may be directly mounted to a transmission rod 25. Alternatively, as shown in FIG. 4, the end portion of the driving shaft of the motor 23 is connected to the end portion of the transmission rod 25 by a transmission chain 29. In order to the rotary motion of the motor 23 to be transferred to the transmission rod 25 at a proper transmission ratio, the transmission chain 29 can surround a driving wheel positioned at the end of the driving shaft of the motor and a driven wheel positioned at the end portion of the transmission rod 25, and two wheels are arranged at a proper transmission ratio.

It shall be noted that the driving means 23 for producing a driving force is not limited to the embodiment, it may be configured by other actuating means, for example, the driving means comprise one or more of a motor, a belt, a chain, a cable, hydraulics and pneumatics.

In the present embodiment and as shown in FIG. 4, the transmission means includes the transmission rod 25, two sets of lifting members 24 symmetrically arranged at both ends of the transmission rod 25 and a plurality of pulleys 26. The pulleys 26 can also be mounted on the top equipment frame 16. The lifting members 24 are preferably configured as lifting belts 24, one ends of two sets of lifting belts 24 surround the ends of the transmission rod 25 and are engaged with the ends of the transmission rod 25, then the lifting belts bypass the pulleys 26, and the other ends of the lifting belts 26 are fixedly connected to the advance shaft supporting frame 22. Thus, when the motor 23 rotates the transmission rod 25 in a first direction, the lifting belts 24 around the end of the transmission rod 25 and the pulleys 26 can lift up the shaft supporting means 22, and correspondingly lift up the advance shafts 21. If the motor 23 rotates the transmission rod 25 in a second reverse direction, and the lifting belts 24 can enable the shaft supporting means 22 to be descended, and accordingly descend the advance shafts 21.

In the embodiment, the rotary motion of the driving means 23 in the transmission mean is subjected to transition into the perpendicular motion perpendicular to the direction of the horizontal plane so as to perpendicularly lift the advance shafts 21 to the second position from the first position, and such a moving path is convenient.

The advance shaft transition apparatus 20 of the present invention is further particularly provided with accommodating mechanisms for accommodating the ends of the lifting belts 26.

According to a preferred embodiment in FIG. 4, in the embodiment, the accommodating mechanism is configured into a form of an accommodating guide 27, and a guide slot is formed in the accommodating guide 27.

Preferably, the accommodating guides 27 are symmetrically arranged at both ends of the transmission rod 25, and are used for synchronously accommodating the ends of the lifting belts 24 at both sides. The guide slots in the accommodating guides 27 can accommodate the end portions of the lifting belts 24 extending out of the ends of the transmission rod 25 when the advance shaft 21 is lifted up. The accommodating rods 27 are preferably arranged at the ends of the transmission rod 25 and are perpendicular to a plane of the axis of the transmission rod 25. A length of the accommodating guide 27 corresponds to a distance between the first position and the second position.

In the embodiment, the accommodating guide 27 is arranged separately, but the accommodating guide 27 may also be integrated into the top equipment frame 16 to become one portion of the top equipment frame 16.

The transmission means for transmitting the driving force from the driving means to the shaft supporting means can be configured as other form, such as the transmission means may comprises a belt, chain, gear, pulley and/or rod.

Moreover, the lifting means may be also provided with a limiting switch for limiting a lifting and descending position of the advance shaft 21, and when the lifting means is lifted up or descended to a preset position, the limiting switch is actuated, so that the lifting means stops moving.

The lifting means according to the present invention can conveniently move an advance shaft assembly including the advance shafting 21 and the supporting frame 22 between the mode transition process of the hot foil stamping and die-cutting equipment 10, and an operator does not need to manually carry out transition of the arrangement of the advance shaft assembly.

The hot foil stamping and die-cutting equipment 10 is provided with the top equipment frame and a lower base on the foil-feeding and stripping station 300 of the hot foil stamping and die-cutting equipment 10, the lifting means of the advance shaft transition apparatus 20 is generally fixed on the top equipment frame of the equipment, and the advance shaft of the advance shaft transition apparatus and the supporting frame 22 for supporting the advance shaft are movably arranged in a space between the top equipment frame and the lower base. Assuming that the hot foil stamping and die-cutting equipment 10 is originally in a hot foil stamping operation mode, at the moment, the advance shaft is moved to the first position close to the lower base by the lifting means, and moreover, the stamping material, such as the foil film, bypasses the advance shaft 21 to be fed to the station 200; when the operator inputs an instruction, the driving means 23 in the advance shaft transition apparatus 20 rotates to actuate, the shaft supporting means is actuated by the lifting belts 24 to be lifted up to leave the first position and stops until reaching the second position close to the top equipment frame, and the advance shafts are in the non-operation position, then an operator mounts a stripping apparatus which needs to be used in the die-cutting operation in the lower base of the equipment 10, and at the moment, the equipment 10 is subjected to transition into a die-cutting operation mode.

By adopting the advance shaft transition apparatus according to the present invention, convenience in transition of the hot foil stamping and die-cutting equipment 10 between the bronzing and die-cutting modes is obviously improved.

According to the solution of the present invention, the existing hot foil stamping and die-cutting equipment 10 can be improved, and the lifting means of the advance shaft transition apparatus 20 sufficiently utilizes the space of the top equipment frame and can be easily combined into existing sheet equipment.

Although the present invention is disclosed as above with preferred embodiments, the present invention is not limited thereto and a person skilled in the art may make possible variations and modifications without departing from the spirit and scope of the present invention. Thus, any modifications, equivalent changes and variations made to the above embodiments according to the technical essence of the present invention without departing from the disclosure of the technical solution of the present invention all fall into the protection scope defined by the claims of the present invention.

The invention claimed is:

1. An advance shaft transition apparatus in a hot foil stamping device, the advance shaft transition apparatus comprising:

at least one advance shaft for feeding foils to a stamping area;

advance shaft supporting means, the advance shaft supporting means supporting at least part of at least one advance shaft in a manner that the at least one advance shaft can rotate;

a driving apparatus for the at least one advance shaft, wherein the driving apparatus is fixed to the advance shaft supporting means; and a lifting means connected to the advance shaft supporting means to enable the at least one advance shaft to move between a first position and a second position, the lifting means including a driving means and transmission means, the transmission means including a plurality of lifting members and a plurality of pulleys, each of the plurality of lifting members arranged around the plurality of pulleys and having at least one end fixedly connected to the advance shaft supporting means, wherein at the first position, the at least one advance shaft is in an operation position, and at the second position, the at least one advance shaft is in a non-operation position.

2. The advance shaft transition apparatus according to claim 1, wherein the advance shaft supporting means comprises a frame, supporting the at least one advance shaft at extremities of the at least one advance shaft.

3. The advance shaft transition apparatus according to claim 1, wherein the driving means comprises a motor.

4. The advance shaft transition apparatus according to claim 3, wherein the driving means comprises the motor, the lifting member is connected to the advance shaft supporting means, and the motor enables the lifting member to extend and retract.

5. The advance shaft transition apparatus according to claim 4, wherein the transmission means further include a transmission rod driven by the driving means, the transmission rod extending substantially parallel to the at least one advance shaft, one end of the lifting member being engaged with the transmission rod and the other end of the lifting member being engaged with the advance shaft supporting means.

6. The advance shaft transition apparatus according to claim 5, wherein the advance shaft supporting means includes a first bracket for supporting a first end of the at least one advance shaft and a second bracket for supporting a second end of the at least one advance shaft;

the lifting member includes a first lifting member connected to the first bracket and a second lifting member connected to the second bracket, the first lifting member is respectively connected to a first end of the transmission rod and the first bracket, and the second lifting member is respectively connected to a second end of the transmission rod and the second bracket.

7. The advance shaft transition apparatus according to claim 5, wherein the lifting means further includes an accommodating guide for accommodating an end portion of the lifting member, and the accommodating guide is arranged in a plane perpendicular to the transmission rod.

8. The advance shaft transition apparatus according to claim 3, wherein the motor is mounted outside of the end of the advance shaft.

9. The advance shaft transition apparatus according to claim 1, wherein the transmission means comprises a belt, chain, pulley and/or road.

10. The advance shaft transition apparatus according to claim 1, wherein the lifting means move the advance shafts to the second position from the first position in a direction basically perpendicular to a horizontal plane.

11. A hot foil stamping equipment provided with the advance shaft transition apparatus according to claim 1 and having a hot foil stamping working mode and a die-cutting working mode, wherein when the hot foil stamping die-cutting equipment is in the hot foil stamping working mode, the advance shafts are positioned at the first position, and when the hot foil stamping die-cutting equipment is in the die-cutting working mode, the advance shafts are positioned at the second position.

12. The hot foil stamping equipment according to claim 11, comprising:

a feeding station, the feeding station being used for feeding sheets to the hot foil stamping die-cutting equipment;

a platen station, the platen station being positioned on the downstream of the feeding station along a sheet conveying direction and used for carrying out pressing-cutting or embossing machining on the sheets;

a foil-feeding and stripping station, the foil-feeding and stripping station being positioned on the downstream of the platen station along a sheet conveying path; and a delivery station, the delivery station being positioned on the downstream of the foil-feeding and stripping station and used for enabling the machined sheets to form a sheet stack, wherein the advance shaft transition apparatus is arranged in the foil-feeding and stripping station, and when the hot foil stamping die-cutting equipment is in a die-cutting mode, the advance shaft is moved to the second position, and a stripping apparatus is arranged below the advance shafts.

13. The advance shaft transition apparatus of claim 1, wherein the driving apparatus of the advance shaft supporting means is configured to rotate the at least one advance shaft.

14. The advance shaft transition apparatus according to claim 1, wherein the driving means is attached to an equipment frame of the hot foil stamping device, and the transmission means further comprises a transmission rod driven by the driving means, wherein the plurality of lifting members includes two sets of lifting belts symmetrically arranged at both ends of the transmission rod, and the plurality of pulleys are mounted to the equipment frame.

15. The advance shaft transition apparatus according to claim 14, wherein a first end of each of the two sets of lifting belts surrounds an end of the transmission rod and is engaged with an end of the transmission rod, the lifting belts are arranged around the plurality of pulleys, and a second end of each of the lifting belts is fixedly connected to the advance shaft supporting means.

16. The advance shaft transition apparatus according to claim 1, further comprising a plurality of accommodating guides.

17. The advance shaft transition apparatus according to claim 16, wherein the plurality of accommodating guides include a guide slot formed within.

18. The advance shaft transition apparatus according to claim 16, wherein the plurality of accommodating guides are configured to accommodate an end portion of the lifting members when the advance shaft is in the second position.

19. The advance shaft transition apparatus according to claim 18, wherein a length of the plurality of accommodating guides corresponds to a distance between the first position and the second position.

20. The advance shaft transition apparatus according to claim 16, wherein the accommodating guides are symmetrically arranged at both ends of a transmission rod.

* * * * *